July 14, 1959  O. YACKEL  2,894,785
TRUCK BOX DUMPING DEVICES
Filed July 8, 1953  3 Sheets-Sheet 1

Inventor
O. Yackel
By J. S. Roxburgh
His Atty

July 14, 1959  O. YACKEL  2,894,785
TRUCK BOX DUMPING DEVICES
Filed July 8, 1953  3 Sheets-Sheet 2

July 14, 1959

O. YACKEL 2,894,785

TRUCK BOX DUMPING DEVICES

Filed July 8, 1953

Inventor
O. Yackel
By G.S. Roxburgh
His Atty

United States Patent Office 2,894,785
Patented July 14, 1959

2,894,785

TRUCK BOX DUMPING DEVICES

Otto Yackel, Yorkton, Saskatchewan, Canada

Application July 8, 1953, Serial No. 366,839

3 Claims. (Cl. 298—22)

The invention relates to a truck box dumping device and a general object of the invention is to provide a box dumping unit which can be easily and quickly mounted on an existing truck frame and connected to the box and utilized to rearwardly dump the loaded box as and when required and to return the box to its normal horizontal position, on the truck frame.

A further object is to provide in combination with a rearwardly dumpable truck box, a unit embodying a pendant cradle pivotally suspended from the truck frame, and pivotally supporting a cylinder with fluid actuated piston and piston rod and having the free end of the rod pivotally connected to the under part of the box structure.

A further object is to provide means for elevating the cradle and cylinder to a position where they will be well clear of the roadway or field after the load has been dumped and the box has returned to its normal horizontal position on the truck frame.

A further object is to provide a unit presenting a frame for mounting on and to become secured to the truck frame in a desired position, a plurality of similar, pendant, transversely positioned and aligned cradles pivotally suspended from the unit frame, a cylinder associated with each cradle and having its lower end pivotally secured to the lower part of the cradle, a piston and piston rod operatively associated with each cylinder and having its extended upper end pivotally connected to the under part of the box structure and means for simultaneously actuating all pistons by controlled hydraulic pressure.

A further object is to provide means for automatically and simultaneously swinging the cradles forwardly and upwardly upon the box having been dumped and returned to its normal, horizontal position.

A further object is to utilize guided cables secured to the cradles and connected to a common tension spring the tension of which can be adjusted and arranged such that upon the box having returned from dumping position to normal position, the spring automatically raises the cradles and cylinders where they are well clear of the road or field.

A further object is to provide a truck box dumping device utilizing similar, transversely aligned, pendant cradles pivotally carried by the truck frame, similar cylinders having their lower ends pivotally connected to the lower parts of the cradles, the cylinders provided with pistons and extending piston rods pivotally connected to the under part of the box structure, the several pivot points being contained in the same plane during box dumping operation under fluid pressure in the cylinders and to supply means for automatically swinging the cradles and cylinders upwardly and forwardly to positions clear of the roadway or field and positioned such that upon fluid pressure being subsequently applied to the pistons the cradles and cylinders automatically return under fluid pressure to their pendant load lifting positions.

With the above more important objects in view and certain other minor objects which will become more apparent as the description proceeds, the invention consists essentially in the arrangement and construction of parts hereinafter described reference being had to the accompanying drawings in which:

Fig. 5 is a view showing one of the cradles and associated cylinder as they appear when they have been raised to clear the roadway or field.

In the drawings like characters of reference indicate corresponding parts in the several figures.

Figure 1:
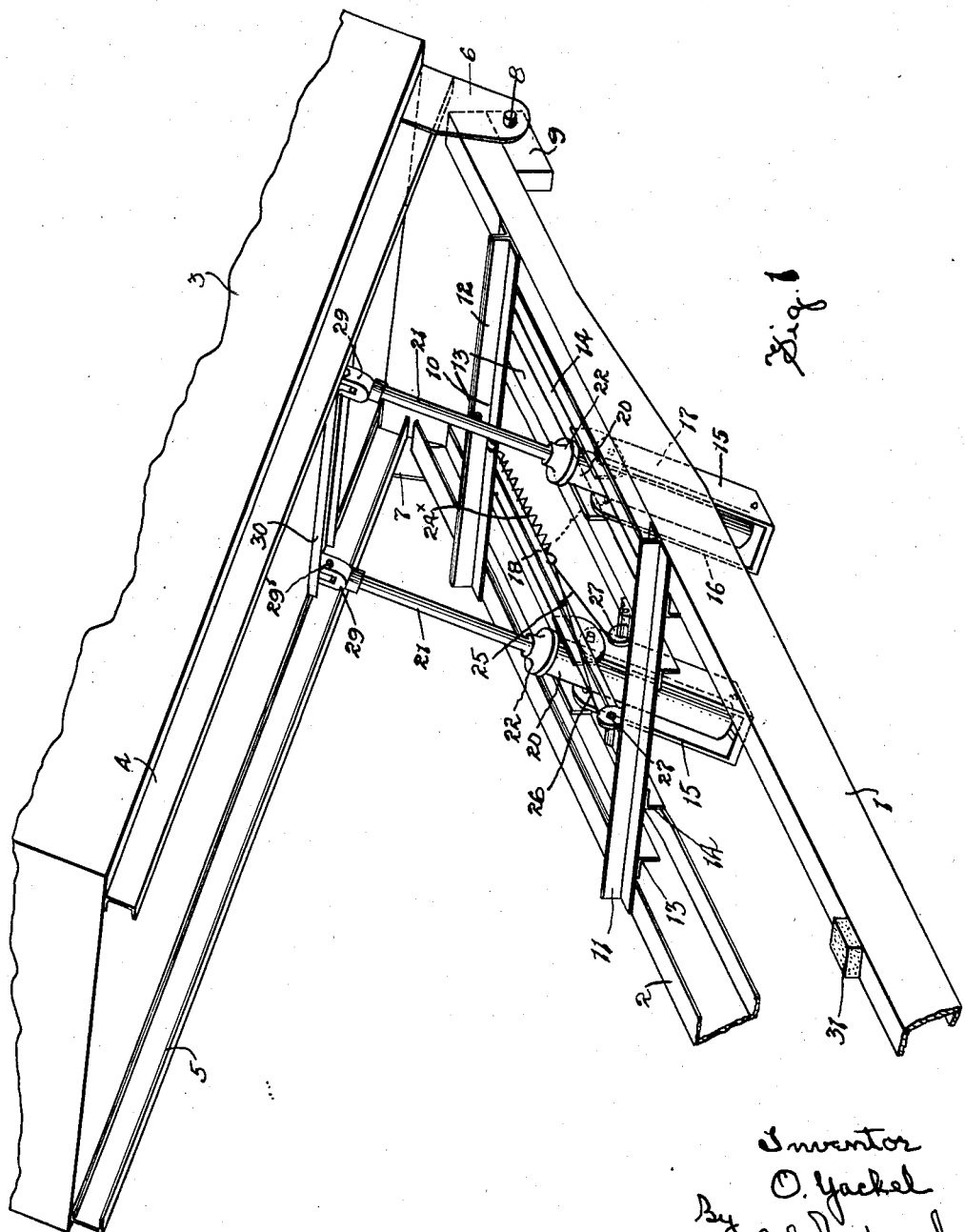
Fig. 1 is a perspective view of a truck frame having a rearwardly dumpable box and supplied with my invention.

In the drawings I have considered it only necessary to show the rear part of a conventional truck frame and the conventional rearwardly dumpable box mounted thereon, as both of which are commercially well known.

The side members or opposing channel irons of a truck frame are indicated by the reference numerals 1 and 2 and the conventional rearwardly dumpable box mounted on the truck frame is indicated generally by the reference number 3 and embodies the usual box supporting side sills 4 and 5.

The rear ends of the sills have downwardly extending side plates 6 and 7 permanently secured thereto and these are herein shown as mounted pivotally on stub axles or short pins 8 secured to blocks 9 welded to the undersides of the side members 1 and 2 of the truck frame, such arrangement being to permit of the rearward dumping of the box by raising the forward end thereof.

In equipping a truck with a rearwardly dumping box as above described I supply a unit which can be easily and quickly mounted on and supported by the side members of the truck frame in a desired location and which embodies all the elements required to dump the box and return it, provided certain of the elements are secured to the box in a chosen location. The unit is now described in detail.

Figure 3:
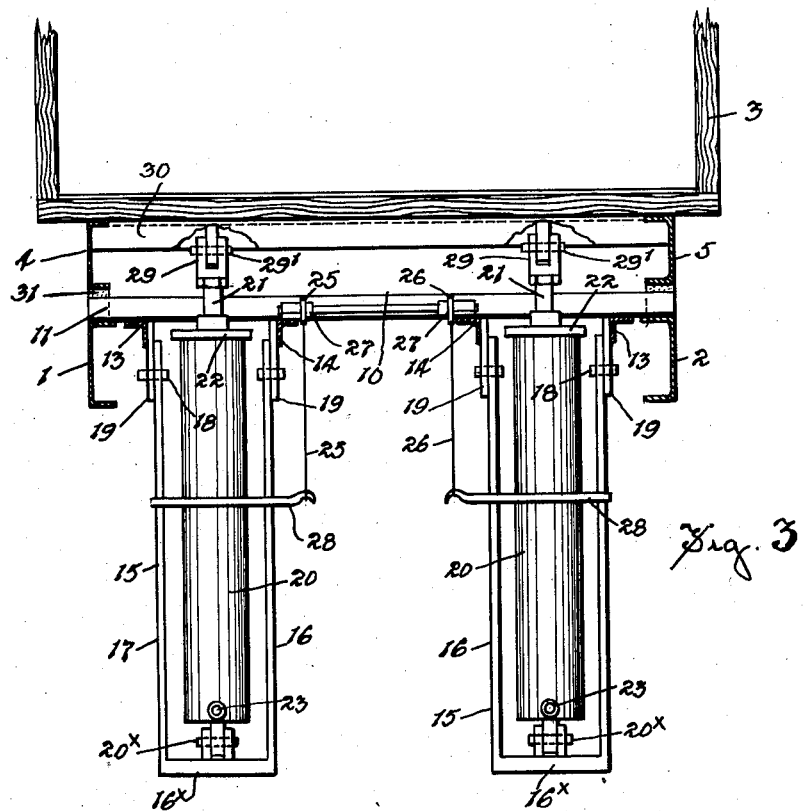
Fig. 3 is a cross sectional view at 3—3 Fig. 2.

A suitable, substantially rectangular, rigid frame 10 is supplied, such being herein shown as embodying forward and rear cross members 11 and 12 connected by pairs of spaced bars 13 and 14. The members 11 and 12 are herein shown as formed from two angle bars welded together in an inverted T-formation to give rigidity and the bars 13 and 14 appear as angle bars welded to the undersides of the members 11 and 12 and having their flanges positioned as best shown in Fig. 3. This rectangular frame is supported by the side members of the truck frame, the ends of the cross members 11 and 12 overlying the truck frame side members and being securely fastened thereto, as by welding, in a desired location, depending on the type of truck and box.

Figure 4:
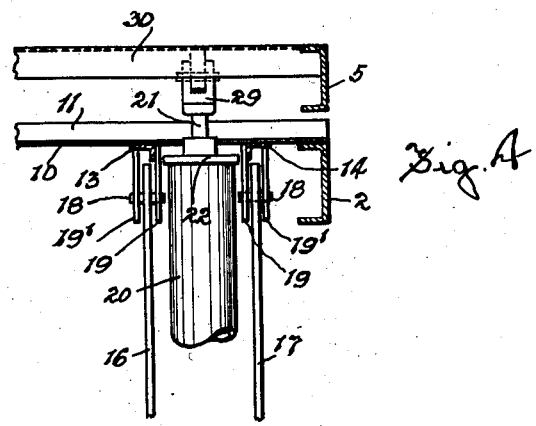
Fig. 4 is a view showing a modified way of pivotally suspending the cradle from the frame of my unit.

Each pair of bars 13 and 14 provide a pivotal support for a cradle 15 which presents a pair of side arms 16 and 17 interconnected by a substantial base member 16$^x$. The upper ends of the arms are connected pivotally by bolts or pivot pins 18 to suitable hangers 19 secured to the angle bars 13 and 14, as shown in Fig. 3. In Fig. 4 a modified arrangement is shown, two hangers 19 and 19' being used to carry the pivot bolt 18, such being both welded to the bars 13 and 14 with the arms 16 and 17 entered therebetween. Obviously any desired dependable mounting could be supplied for the purpose.

The cradle base member 16$^x$ is pivotally connected at 20$^x$, in each instance, to the lower end of a cylinder 20 entered between the arms 16 and 17 and the cylinder is supplied with a piston 20' from which a piston rod 21 extends, the rod passing slidably through the upper end or head 22 of the cylinder. A flexible hose 23 is connected to the lower end of each cylinder and leads to a valve controlled source of fluid pressure supply such as oil. It is common practice on trucks, tractors and such like to utilize hydraulic pressure to actuate cylinder pistons for a desired purpose and to permit of the escape of the fluid (oil) from the cylinders and on such account it is considered sufficient for the purpose of this invention to understand that an attendant permits oil under pressure to enter the cylinders when desired through the hose 23 and subsequently gives a setting that allows the oil to escape from the cylinders in the well known manner.

The rear member 12 carries centrally and slidably an adjustable bolt 24 having the rear end threaded to receive a nut 24′ and the front end connected to a tension spring 24$^x$. The forward end of the spring has two, similar pulling lines or cables 25 and 26 secured thereto which cables extend forwardly and diverge, each cable passing over a guide pulley 27 suitably mounted on one of the inner bars 14 and then extending downwardly and having its free end secured to a cross rod 28 suitably fastened, as by welding, to the rear edges of the side arms of the adjacent cradle. The upper end of each piston rod is fashioned as indicated at 29 to receive a pivot pin 29′.

The above completes the description of the unit.

When the unit is to be introduced on a truck, the frame 10 is placed in a selected position on the truck frame with the ends of the cross members 11 and 12 resting on the truck frame members 1 and 2 and securely fastened thereto, as by welding. The upper ends of the piston rods are then pivotally connected by the pins 29′ to the understructure of the box and in this connection it is mentioned that most boxes have channel irons 30 extending between the side sills 4 and 5 and it is to such that the upper ends of the piston rods are connected pivotally by the pins 29′. If no cross bar exists in the right location one can be supplied for the purpose.

When the box is in its normal horizontal position, resting on the truck frame, one adjusts the tension of the spring by manipulating the nut 24′ and as the nut is tightened up, the spring, through the cables swings the cradles with cylinders to what may be termed their up position where they will remain to maintain ample clearance space between them and the roadway or field. They are shown in their up position in Fig. 5.

Figure 2:
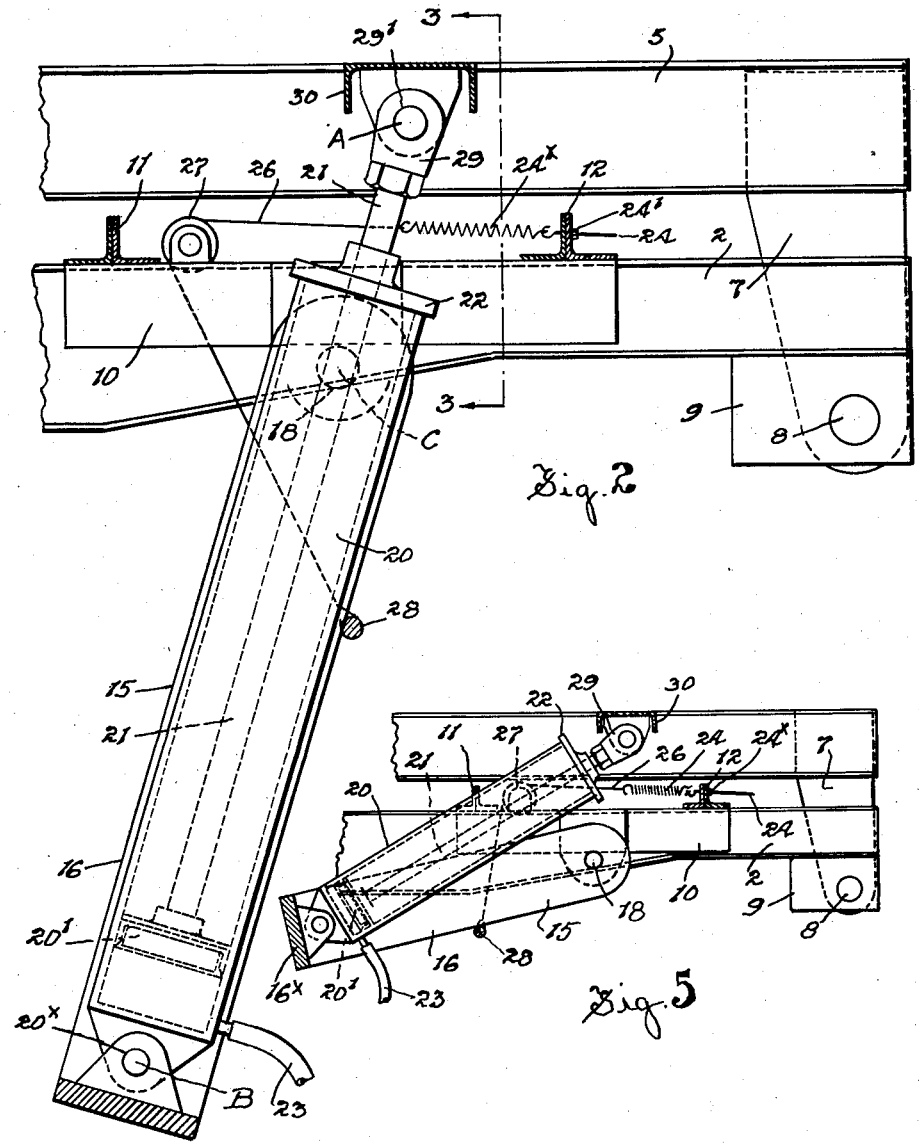
Fig. 2 is an enlarged vertical sectional view through the box understructure and the rear part of the truck frame and showing the position taken by the cradle and cylinder at the time the loaded box is to be dumped.

When it is desired to dump the box of a contained load, the truck operator will actuate the well known control to permit fluid under pressure to simultaneously enter the lower ends of the cylinders. Obviously the admitted fluid under pressure will then cause the pistons to be actuated with the result that the cradles and cylinders will be forced downwardly until they reach a position that the pivot points specifically indicated at A, B and C in Fig. 2 are contained in the same plane, the point C being then in a dead central position between those A and B. Having reached this position, continued fluid pressure will cause the pistons to lift the forward end of the truck box to a load dumping position. When the box has been tilted to a sufficient height to discharge its load the oil is released in the well known manner from the cylinders and the box returns to its original position. After the box has so returned, the spring then acts to raise the cradles with cylinders to their forward up positions as appearing in Fig. 5.

To avoid undesirable shock when the box returns to its horizontal position, I have provided the truck frame with rubber or such like bumpers 31 on which the forward end of the box normally rests.

What I claim as my invention is:

1. The combination with a truck chassis frame and a box normally rested thereon and pivotally mounted to the frame for tilting movement about its pivoted end, of a secondary frame secured to the chassis frame in a location in advance of the pivoted axis of the box, a pair of pendant side arms having their upper ends pivotally secured to said secondary frame for forward and rear sway, a base member permanently interconnecting the lower ends of said arms and a hydraulically actuated ram interposed between the said arms and having its one end pivotally connected to said base member and its other end pivotally connected to the underside of the box.

2. The combination with a truck chassis and a dump box normally rested and pivotally mounted thereon for tilting movement about its rear end, of a pair of pendant side arms having their upper ends pivotally supported from the frame in a location in advance of the pivoted axis of the box and a hydraulically actuated hoisting device having its one end pivotally carried between and by the extending lower ends of said side arms and its other end pivotally connected to the under side of the box, the pivotal points of the side arms and those of the apparatus being so positioned that in the entire hoisting movement of the box said pivot points are maintained in a common plane.

3. The device as claimed in claim 2 wherein means is provided to raise the pendant side arms forwardly to an up position underlying the box and subsequent to the return of the box to rested position following the tilting thereof.

References Cited in the file of this patent

UNITED STATES PATENTS

| 1,858,797 | Wood et al. | May 17, 1932 |
| 1,925,296 | Barrett | Sept. 5, 1933 |
| 2,509,911 | Dore | May 30, 1950 |
| 2,603,518 | Golay | July 15, 1952 |

FOREIGN PATENTS

| 654,962 | France | Dec. 7, 1928 |